United States Patent
Chen et al.

(10) Patent No.: US 12,314,541 B2
(45) Date of Patent: May 27, 2025

(54) INTERACTION INFORMATION PROCESSING METHOD AND APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Kojung Chen, Beijing (CN); Xiao Han, Beijing (CN); Li Zhao, Beijing (CN); Jingsheng Yang, Beijing (CN); Yin Shi, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/883,877

(22) Filed: Aug. 9, 2022

(65) Prior Publication Data

US 2022/0391058 A1 Dec. 8, 2022

Related U.S. Application Data

(63) Continuation of application No. PCT/CN2021/088044, filed on Apr. 19, 2021.

(30) Foreign Application Priority Data

Apr. 30, 2020 (CN) .......................... 202010366928.7

(51) Int. Cl.
*G06F 3/0484* (2022.01)
*G06F 3/16* (2006.01)
(Continued)

(52) U.S. Cl.
CPC ............ *G06F 3/0484* (2013.01); *G06F 3/167* (2013.01); *G10L 17/06* (2013.01); *G10L 17/22* (2013.01)

(58) Field of Classification Search
CPC ....... G06F 3/0484; G06F 3/167; G10L 17/06; G10L 17/22; G10L 15/005; G10L 15/30; H04N 7/15; H04N 21/2187; H04N 21/233
See application file for complete search history.

(56) References Cited

U.S. PATENT DOCUMENTS 10,819,532 B1 * 10/2020 van Rensburg ....... H04L 51/216
11,269,591 B2 * 3/2022 Shetty ..................... G10L 15/22
(Continued)

FOREIGN PATENT DOCUMENTS

CN 102929917 A 2/2013
CN 104615593 A 5/2015
(Continued)

OTHER PUBLICATIONS

First Office Action received in 2021 for CN Application No. 202010366928.7, English translation (18 pages).
(Continued)

*Primary Examiner* — Andrey Belousov

(57) ABSTRACT

An interaction information processing method and apparatus, an electronic device and a storage medium are provided. The method comprises: generating an interaction information record based on interaction behavior data of users in an interaction process conducted by the users on a real-time interactive interface; selecting, from the interaction information record, target interaction information that satisfies a target selection condition; and displaying the target interaction information in a target area of the real-time interactive interface distinctively from other interaction information elements in the interaction information record, wherein the target interaction information is one or more interaction information elements in the interaction information record.

17 Claims, 4 Drawing Sheets

(51) Int. Cl.
*G10L 17/06* (2013.01)
*G10L 17/22* (2013.01)

(56) References Cited

U.S. PATENT DOCUMENTS

| | | |
|---|---|---|
| 2011/0213607 A1 | 9/2011 | Onishi |
| 2011/0246172 A1 | 10/2011 | Liberman et al. |
| 2013/0073989 A1 | 3/2013 | Harris et al. |
| 2013/0201306 A1 | 8/2013 | Calman |
| 2014/0310357 A1* | 10/2014 | Banatwala ............. H04L 51/04 709/206 |
| 2015/0073789 A1 | 3/2015 | Hashimoto et al. |
| 2016/0094866 A1 | 3/2016 | Frazzini et al. |
| 2019/0068661 A1* | 2/2019 | Masi ..................... G06F 3/1454 |
| 2019/0182062 A1 | 6/2019 | Skiff et al. |
| 2020/0167699 A1* | 5/2020 | Cohen ..................... H04L 51/52 |
| 2021/0234978 A1* | 7/2021 | Matsuki ................. G06F 9/454 |

FOREIGN PATENT DOCUMENTS

| | | | |
|---|---|---|---|
| CN | 104679405 A | | 6/2015 |
| CN | 105488116 A | * | 4/2016 ........... G06F 16/338 |
| CN | 105632498 A | | 6/2016 |
| CN | 106375865 A | | 2/2017 |
| CN | 107645686 A | | 1/2018 |
| CN | 107911646 A | | 4/2018 |
| CN | 108881789 A | | 11/2018 |
| CN | 110392312 A | | 10/2019 |
| CN | 110851745 A | | 2/2020 |
| JP | 2000284876 A | | 10/2000 |
| JP | 2009194857 A | | 8/2009 |
| JP | 2011209731 A | | 10/2011 |
| JP | 2013029684 A | | 2/2013 |

OTHER PUBLICATIONS

Search Report and Written Opinion mailed Jul. 21, 2021 in PCT Application No. PCT/2021/088044, English Translation of Search Report only (11 pages).
Extended European Search Report issued Aug. 18, 2023 for European Application No. 21796877.5 (10 pages).
Notice of Reasons for Refusal issued Nov. 28, 2023 in Japanese Application No. 2022-564172, with English translation (8 pages).

* cited by examiner

INTERACTION INFORMATION PROCESSING METHOD AND APPARATUS, ELECTRONIC DEVICE AND STORAGE MEDIUM

The present application is a continuation application of International Application No. PCT/CN2021/088044, filed on Apr. 19, 2021, which claims priority to Chinese Patent Application No. 202010366928.7, titled "INTERACTION INFORMATION PROCESSING METHOD AND APPARATUS, ELECTRONIC DEVICE AND STORAGE MEDIUM", filed on Apr. 30, 2020 with the China National Intellectual Property Administration, both of which are incorporated herein by reference in entireties.

FIELD

The present disclosure relates to the technical field of computer data processing, and in particular to a method and apparatus for processing interaction information, an electronic device, and a storage medium.

BACKGROUND

Nowadays, in real-time interactive application scenarios such as Internet-based multimedia conferences or live video broadcasts, voice information of some users and text information published by all users may be acquired by a server, and the voice information and the text information may be processed, played or displayed.

In actual applications, if a user A does not understand information published by a user B, the user A needs to query the published information and operation information corresponding to the user B. That is, there is a need to understand the published information and the operation information of a target user in the current interaction process.

However, relevant information associated with the target user cannot be acquired and displayed based on related technologies, that is, the published information and the operation information of the target user cannot be acquired, so that core concepts expressed by the target user cannot be confirmed, which greatly reduces the efficiency of information interaction in the interaction process.

SUMMARY

A method and apparatus for processing interaction information, an electronic device, and a storage medium are provided according to embodiments of the present disclosure, to effectively process and display information in an interactive scenario, so as to improve the efficiency of communication.

In a first aspect, a method for processing interaction information is provided according to an embodiment of the present disclosure. The method includes:
  generating an interaction information record based on interaction behavior data of users in an interaction process conducted by the users on a real-time interactive interface;
  selecting, from the interaction information record, target interaction information that satisfies a target selection condition; and
  displaying the target interaction information in a target area of the real-time interactive interface distinctively from other interaction information elements in the interaction information record, where the target interaction information is one or more interaction information elements in the interaction information record.

In a second aspect, an apparatus for processing interaction information is further provided according to an embodiment of the present disclosure. The apparatus includes:
  an interaction information recording module, configured to generate an interaction information record based on interaction behavior data of users in an interaction process conducted by the users on a real-time interactive interface;
  an interaction information selecting module, configured to select, from the interaction information record, target interaction information that satisfies a target selection condition; and
  an interaction information distinguishing display module, configured to display the target interaction information in a target area of the real-time interactive interface distinctively from other interaction information elements in the interaction information record, where the target interaction information is one or more interaction information elements in the interaction information record.

In a third aspect, an electronic device is further provided according to an embodiment of the present disclosure. The electronic device includes:
  one or more processors;
  a storage device configured to store one or more programs,
  when the one or more programs are executed by the one or more processors, the one or more processors implementing the method for processing interaction information according to any one of the embodiments of the present disclosure.

In a fourth aspect, a storage medium with computer-executable instructions stored thereon is further provided according to an embodiment of the present disclosure. The computer-executable instructions, when being executed by a computer processor, implement the method for processing interaction information according to any one of the embodiments of the present disclosure.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar interaction information elements. It should be understood that the drawings are schematic and that the original and interaction information elements are not necessarily drawn to scale.

DETAILED DESCRIPTION

Figure 1:
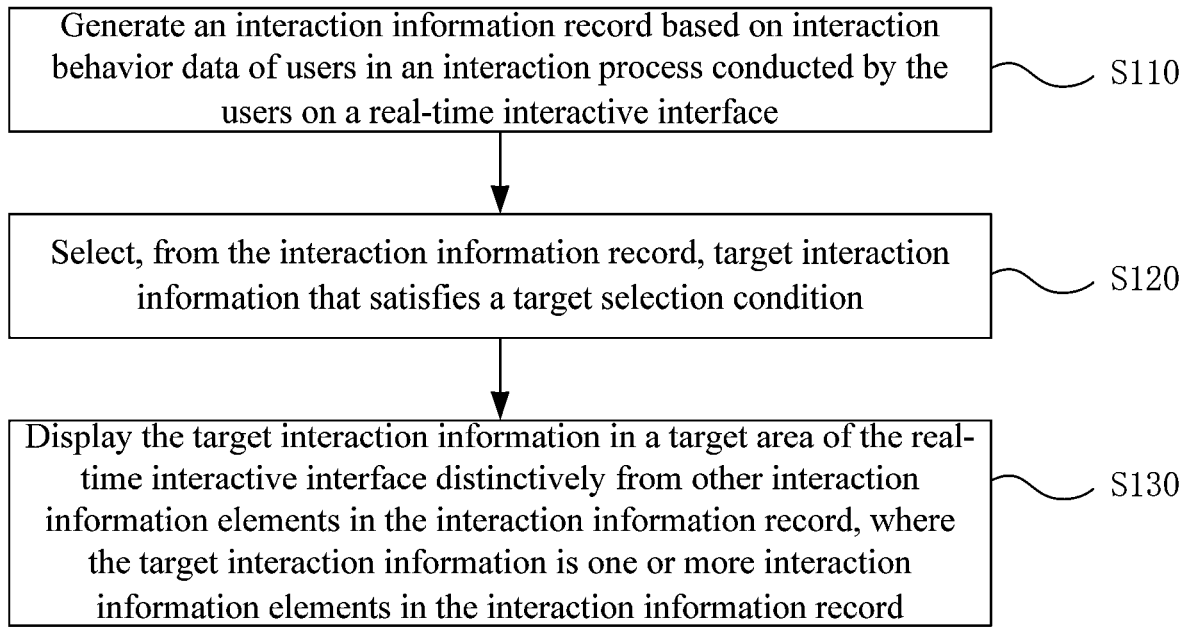
FIG. 1 is a schematic flowchart illustrating a method for processing interaction information according to embodiment 1 of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different apparatuses, modules or units, and are not used to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

Embodiment 1

FIG. 1 is a schematic flowchart illustrating a method for processing interaction information according to embodiment 1 of the present disclosure. The embodiment of the present disclosure is applicable for processing and displaying interaction information of users in a real-time interactive application scenario supported by the Internet. The method may be performed by an apparatus for processing interaction information. The apparatus for processing interaction information may be implemented in the form of software and/or hardware. Optionally, the apparatus for processing interaction information is implemented by an electronic device, and the electronic device may be a mobile terminal, a Personal Computer (PC) or a server, etc. The real-time interactive application scenario is generally implemented by a client and a server collectively. The method according to the present embodiment may be executed by the client, the server, or both.

As shown in FIG. 1, the method includes S110 to S130.

In S110, an interaction information record is generated based on interaction behavior data of users in an interaction process conducted by the users on a real-time interactive interface.

The real-time interactive interface is any interactive interface in a real-time interactive application scenario. The real-time interactive application scenario may be realized through the Internet and computer technology, for example, as an interactive application realized through a native program, a web program or the like. The real-time interactive interface allows multiple users to interact in various interaction behaviors, such as inputting text, voice, video, sharing content objects or other interaction behaviors. Thus, an interaction information record may be generated based on the interaction behavior data of the user(s). The interaction behavior data may include various data involved in the user's interaction behavior, for example, the interaction behavior type and content involved in the interaction behavior. The interaction information record may be generated by each client, or may be generated by the server based on the interaction behavior data of each user and pushed to the client.

In S120, target interaction information that satisfies a target selection condition is selected from the interaction information record.

The target selection condition may be inputted manually by the user or may be generated automatically. The target selection condition is any condition that can realize distinguishing in the interaction information record. For example, at least one of the type, content, time, or user of the interaction behavior may be used as the target selection condition.

Generally, users of the clients are interested in different information, and therefore the target selection conditions of the clients may be different from each other. Each client can conduct the selection from the interaction information record based on a local target selection condition. Alternatively, after acquiring the respective target selection conditions of the clients, the server may conduct the selections from the interaction information record, and then push the selected target interaction information to respective clients.

In S130, the target interaction information is displayed in a target area of the real-time interactive interface distinctively from other interaction information elements in the interaction information record, where the target interaction information is one or more interaction information elements in the interaction information record.

The interaction information record may be displayed in the target area of the real-time interactive interface. The target area may be, for example, an area at the periphery of a main interaction area, such as at a top, a bottom, a side or the like of the main interaction area. For example, in a video conference scenario, a video interaction window is the main interaction area, which occupies an area of ⅔ of a screen, and an area for displaying the interaction information record may be a sub-area in the remaining ⅓ area at a side of the main interaction area.

The interaction information record may include various interaction information elements. The interaction information elements correspond to the interaction behavior data of the user. For example, in text subtitles of a speaker, the speaker's name, the text subtitles or the like are different interaction information elements; in a sharing behavior, a sharer, a type of shared content, the shared content or the like are different interaction information elements.

After the target interaction information is selected, the target interaction information itself is also one or more interaction information elements in the interaction information record. When being displayed, the target interaction information is displayed differently from other interaction information elements, so as to highlight the selected target interaction information, so that users may find the target interaction information in a more intuitive and convenient manner. The displaying in different manners may be implemented as displaying only the target interaction information while not displaying other interaction information elements, or may be implemented as displaying in different display formats such as in different colors, fonts, and background patterns.

With the technical solutions of the embodiments of the present disclosure, by setting a selection condition, effective selection may be made from the interaction information record in the real-time interaction process of the users and selected information may be displayed differently, so that the interacting users can selectively acquire the interaction information, thereby improving the efficiency of interaction.

The technical solutions of the embodiments of the present disclosure are applicable to various real-time interactive application scenarios, especially multimedia real-time interactive scenarios. The real-time interactive interface may be, for example, a video conference interactive interface, a live video interactive interface, or a group chat interactive interface. The interaction behaviors in the real-time interactive scenarios can be in one or more forms including, for example, text, voice, video, whiteboard, content-sharing, or the like. In the multimedia real-time interactive scenarios, considering that the interaction behaviors are scrolling in real time and are displayed with a fast speed and a short time, and there are problems that the users are not familiar with the displaying method, it is preferable that the interaction behavior data is converted into a static interaction information record as an auxiliary displaying. The static interaction information record may record multimedia interaction data by means of texts, pictures or the like.

In the embodiment of the present disclosure, the interaction behavior data includes user voice data, and content of the interaction information record includes text data obtained by recognizing the user voice data; alternatively, the interaction behavior data includes user operational behavior data, and content of the interaction information record includes text data obtained by recognizing the user operational behavior data; alternatively, the interaction behavior data includes user voice data and user operational behavior data, and content of the interaction information record includes text data obtained by recognizing the user voice data and text data obtained by recognizing the user operational behavior data. The text data is equivalent to a subtitle text corresponding to the user voice.

There may be various user operational behaviors, and typical user operational behavior data may include a sharing behavior and shared content. The sharing behavior is an operation type. The sharing behavior is an operational behavior type of presenting the shared content to each user. The shared content includes a shared document, a shared screen and/or a web link, and the like. Both the operational behavior type and the shared content may be converted into the interaction information record. Those skilled in the art can understand that the user operational behavior in a multimedia real-time interactive application scenario is not limited to sharing content, but may further include behaviors such as whiteboard writing or the like.

Embodiment 2

Figure 2:
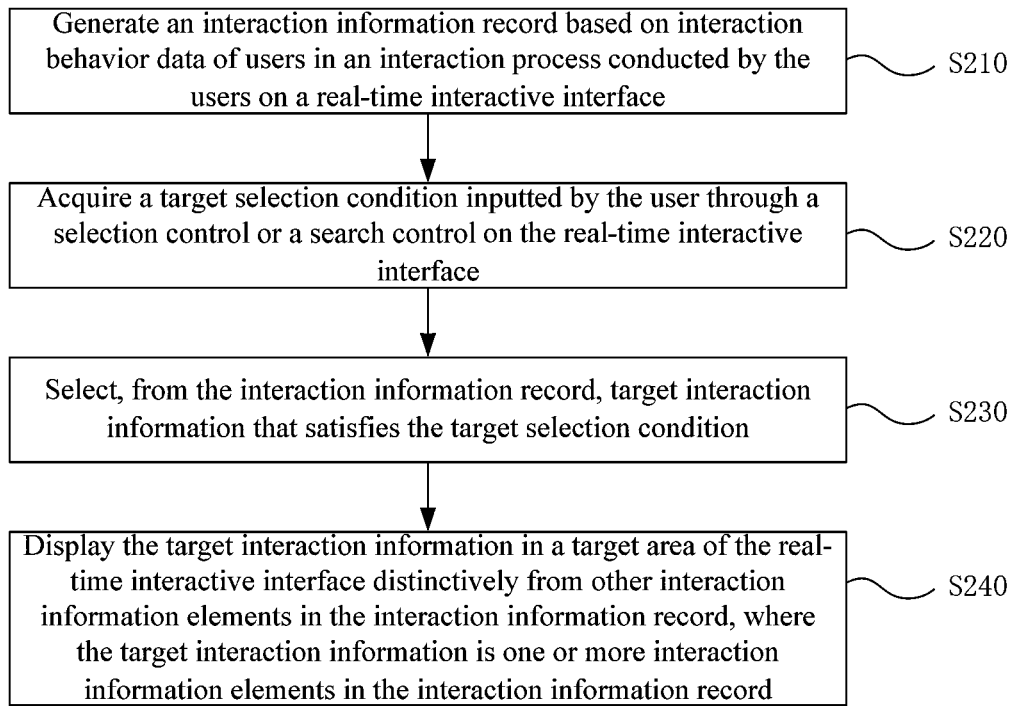
FIG. 2 is a schematic flowchart illustrating a method for processing interaction information according to embodiment 2 of the present disclosure.

FIG. 2 is a schematic flowchart illustrating a method for processing interaction information according to embodiment 2 of the present disclosure. Based on the foregoing embodiments, the present embodiment provides optional solutions for determining the target selection condition and content of the target selection condition. The method of the present embodiment includes S210 to S240.

In S210, an interaction information record is generated based on interaction behavior data of users in an interaction process conducted by the users on a real-time interactive interface.

In S220, a target selection condition inputted by the user is acquired through a selection control or a search control on the real-time interactive interface.

The selection control includes at least one of a selection list, a condition input box or an option label.

Optionally, the target selection condition includes at least one of the following conditions: a content keyword, a speaking user of voice data, an activity level of the speaking user, an operational behavior type, or an operational behavior content object.

The content keyword may be related to the content of various interaction information elements, for example, the name of a speaker, the text of speech of the speaker, or the text of the shared content. The speaking user of the voice data is a selection condition determined from the aspect of the users, and may only pay attention to the speech content of certain speaker(s), for example, only pay attention to the host. The activity level of the speaking user is also a selection condition determined from the aspect of the users. The activity of the speaking user generally refers to the activity of the user in implementing an interaction behavior, which can be the frequency, quantity or quality of one interaction behavior or several interaction behaviors. For example, an evaluation index of the activity may include the number of speeches per unit time, the number of times of sharing content, the length of speech content, the validity of substantive meaning, and the like. The activity level of each speaking user may be determined according to a quantitative index, so as to selectively pay attention to speaking user(s) with a high activity level. The operational behavior type is a selection condition determined from the aspect of the type of the interaction behavior, so that the user can selectively acquire information records of a certain type or several types of operational behaviors, for example, only acquire the interaction information related to content-sharing. The operational behavior content object is a selection condition determined from the aspect of the interaction behavior object. For example, the sharing behavior, of which the content object is document, may be identified and displayed separately.

In the present embodiment, the target selection condition may be inputted manually by the user. For example, the target selection condition may be acquired through a selection control or a search control set on a real-time interactive interface. Taking the speaking user of the voice data as an example, all the speaking users may be displayed in a selection list, from which the user may make the selection by clicking. Taking the content keyword as an example, the search control, such as a search input field, may be provided for the user to input the content keyword, so to determine the target selection condition. Taking the activity level of the speaking user as an example, option labels of multiple activity levels or a condition input box may be provided for the user to select.

The content of the selection control may be dynamically generated according to the real-time interaction process or the content of the interaction information record. For example, with the increase or decrease of the speaking users, the selection list of the speaking users may be correspondingly increased or decreased; available label options of operational behavior types may be added in response to the increase of interaction behavior types.

In S230, target interaction information that satisfies the target selection condition is selected from the interaction information record.

In S240, the target interaction information is displayed in a target area of the real-time interactive interface distinctively from other interaction information elements in the interaction information record, where the target interaction information is one or more interaction information elements in the interaction information record.

With the technical solution of the present embodiment, a variety of controls can be provided in the real-time interactive interface for the user to conveniently input the target selection condition.

Embodiment 3

Figure 3:
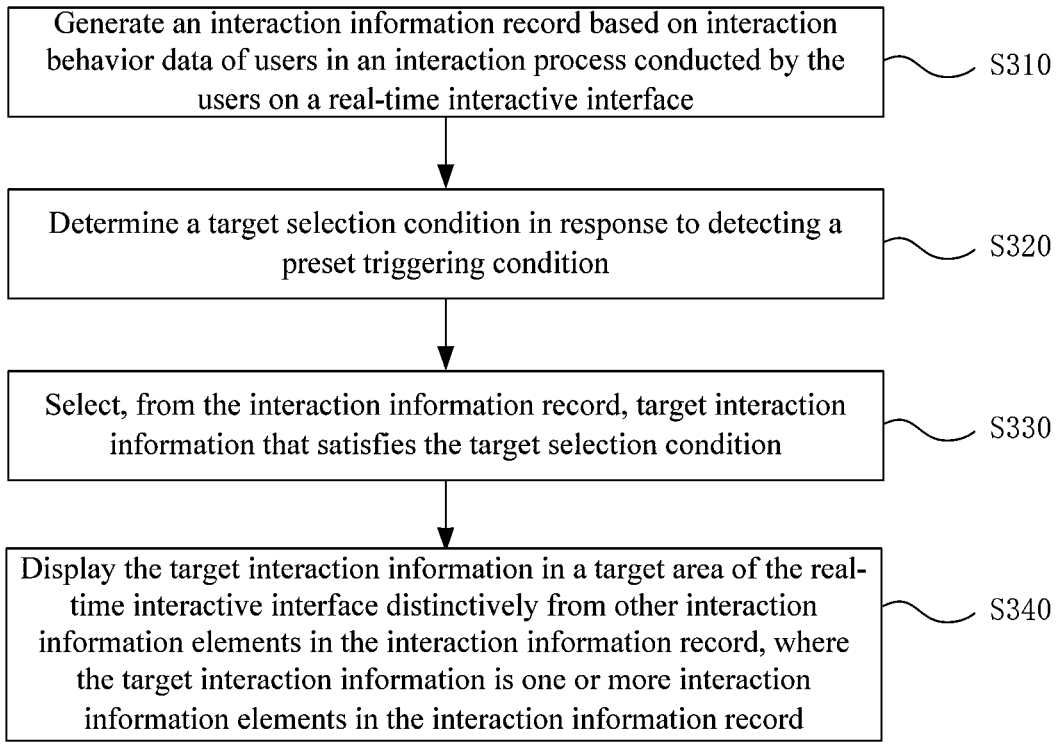
FIG. 3 is a schematic flowchart illustrating a method for processing interaction information according to embodiment 3 of the present disclosure.

FIG. 3 is a schematic flowchart illustrating a method for processing interaction information according to embodiment 3 of the present disclosure. On the basis of the foregoing embodiments, the present embodiment provides another implementation for determining the target selection condition. The method includes S310 to S340.

In S310, an interaction information record is generated based on interaction behavior data of users in an interaction process conducted by the users on a real-time interactive interface.

In S320, a target selection condition is determined in response to detecting a preset triggering condition.

In the present embodiment, it is optional to automatically determine the target selection condition by setting a triggering condition, thereby further reducing the degree of manual participation of the user and providing the user with intelligent services.

The triggering condition may be set from various aspects as needed, for example, it may include at least one of the following: reaching a preset time point in the interaction, the user voice data including indicative voice data, or language types used by speaking users being different from the language type used on a current client.

The preset time point may be an absolute time point or a relative time point. The absolute time point may refer to an exact moment, such as a time point "x:xx" at which the determination of the target selection condition is triggered. The relative time point may be determined according to the duration of an interval, for example, the determination of the target selection condition may be triggered once at a set interval.

The user voice data including indicative voice data means that the determination of the target selection condition can be triggered by means of a voice instruction of the user. The indicative voice data may be an explicit instruction with a set word, or it may be used to recognize the user's intention to make selection. The explicit instruction with a set word may be an instruction of a set sentence structure, for example, "I want to see the speech text of XX user". Intention recognition can be more intelligent in determining the user's intention, for example, "I can't hear XX user clearly" indicates that the user is intent to view the content of the XX user's speech, which can trigger the determination of the target selection condition.

There are differences in the types of languages used by the speaking users, i.e., there are multiple languages in the interactive voice. For example, if a user on a client speaks in Chinese, the user may not be able to figure out and understand the speech of other users in English. In this case it is necessary to pay special attention to the content of the speech that is in a different language, and the target selection condition is required to be triggered. A client may be used by one user or may be used by multiple users at the same time, and therefore the language type used by the speaking user(s) corresponding to the client may be one or several. When a certain client recognizes that the speaking language of a non-local speaking user is different from the language type used by the local speaking user, it can be determined that there is a triggering condition since the local speaker may need to particularly view the speech content of other differential languages. Differential languages refer to languages different from the language type used by the local speaking user. For example, if the language type used by the local speaking user is Chinese, the languages different from Chinese can be called differential languages.

In S330, target interaction information that satisfies the target selection condition is selected from the interaction information record.

In S340, the target interaction information is displayed in a target area of the real-time interactive interface distinctively from other interaction information elements in the interaction information record, where the target interaction information is one or more interaction information elements in the interaction information record.

In the above technical solution, preferably, determining the target selection condition in response to detecting a preset triggering condition may specifically include: determining the target selection condition in response to detecting the preset triggering condition based on collected interaction behavior data, during a real-time interaction process of the users. That is, whether there is a triggering condition is determined through the interaction behavior data. The user's interaction behavior data usually carries the demand or intention of the user to pay attention to some information. Therefore, determining the triggering condition based on the interaction behavior data can improve the accuracy in determining the target selection condition for the user.

Further, determining the target selection condition may specifically include: determining the target selection condition based on the collected interaction behavior data. That is, the interaction behavior data is used not only in determining whether there is a triggering condition for determining the target selection condition, but also in determining the content of the target selection condition.

Optionally, determining the triggering condition and/or determining the target selection condition based on the interaction behavior data may include various situations. For example, determining the target selection condition in response to detecting the preset triggering condition based on collected interaction behavior data, during a real-time interaction process of the users, includes at least one of the following cases.

In a first case, a current activity value of each user is determined based on the collected interaction behavior data, and the target selection condition is determined based on the current activity value.

For example, the current activity values of the users may be determined based on the interaction behavior data, and then, when the users' current activity value reaches a preset standard, the user whose current activity value is higher than the preset activity value may be determined as the target selection condition, so as to achieve the effect of only displaying interaction content of active user. The preset standard is, for example, that there are N to M users whose activity level is high, and both N and M are preset positive integers.

In a second case, a language type used by each user is determined based on the collected interaction behavior data, and the target selection condition is determined based on the language type.

Users may have communication barriers due to language type, therefore the target selection condition may be determined based on the language type, which may specifically include:

determining a current language type corresponding to each user based on voice data in the interaction behavior data, and determining other language types different from the current language type as the target selection condition; or, determining a preset target language type of each client, and determining other language types different from the target language type as the target selection condition.

With the above operations, each client can identify and filter the language of the user at other clients for the local speaking user.

Therefore, before determining a language type used by each user based on the collected interaction behavior data, the method may further include: performing voiceprint recognition on the voice data of each user to determine a speaking user to which the voice data belongs. A client generally has a corresponding client account or client ID to distinguish among different clients. However, if multiple users are participating a meeting with one client, the multiple users cannot be distinguished by the client ID. In this case, voiceprint recognition can be further performed on the voice data of each user. Each person's voice has a unique voiceprint, and different users can be distinguished accordingly and can be marked as client ID-user A, client ID-user B, so as to distinguish among different speaking users using the same client.

In a third case, a substantive meaning of the interaction behavior data is determined based on the collected interaction behavior data, and the target selection condition is determined based on validity of the substantive meaning of the interaction behavior data.

The substantive meaning of the interaction behavior data may be reflected in aspects of semantics or significance of behavior result. The natural semantics of the information inputted through speech or text can be recognized. Information without valid natural semantics may be regarded as invalid in terms of the substantive meaning of the data. Correspondingly, the information with valid semantics may be regarded as valid in terms of substantive meaning of the data. If the substantive meaning of the data is detected to be valid, the determination of the target selection condition may be triggered, and valid information may be used as a selection object, that is, valid interaction information is an object to be selected. It should be noted that the basis for judging validity can be set or determined according to specific interaction scenarios and actual needs in the interaction. For example, in a video conference, a private chat of multiple users using the same client has indistinct voices and cannot be effectively identified, therefore such messages can be determined as invalid information, and accordingly, information other than such messages is regarded as valid information. The significance of behavior results can be reflected in whether certain operational behaviors of the user can achieve actual behavior results. For example, if a user quickly withdraws after sharing wrong content, such interaction behavior does not have a valid behavior result, and the interaction information can be regarded as invalid. If the user performs a document sharing operation and provides a specific explanation or further elaboration on the shared content, such interaction behavior has a valid behavior result, and such operation may be treated as valid interaction information. In this case, the determination of the target selection condition may be triggered, that is, the interaction behavior data with substantial meaning may be selected.

With the technical solutions of the embodiments of the present disclosure, a generation time and content of the target selection condition can be automatically determined through the interaction behavior data of the user, so that the selection is more intelligent, and interaction information of interest can be displayed in a distinctive manner for the user with as less intervening to the interaction of the user as possible.

Embodiment 4

Figure 4:
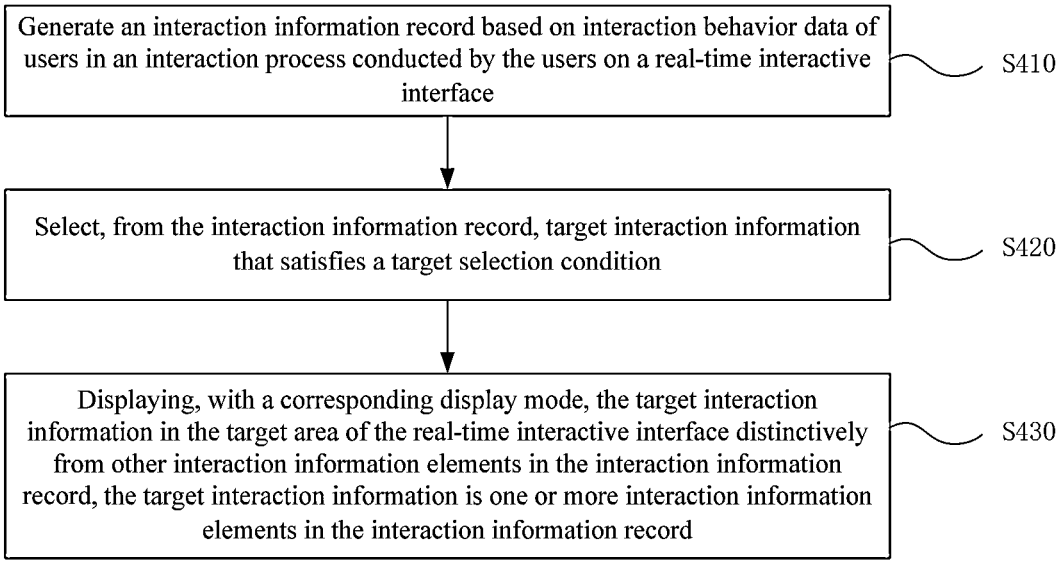
FIG. 4 is a schematic flowchart illustrating a method for processing interaction information according to embodiment 4 of the present disclosure.

FIG. 4 is a schematic flowchart illustrating a method for processing interaction information according to embodiment 4 of the present disclosure. On the basis of the foregoing embodiments, the present embodiment further provides a method for displaying target interaction information in a distinctive manner. The method includes S410 to S430.

In S410, an interaction information record is generated based on interaction behavior data of users in an interaction process conducted by the users on a real-time interactive interface.

In S420, target interaction information that satisfies a target selection condition is selected from the interaction information record.

In S430, the target interaction information is displayed, with a corresponding display mode, in a target area of the real-time interactive interface distinctively from other interaction information elements in the interaction information record, where the target interaction information is one or more interaction information elements in the interaction information record.

The mode for displaying the target interaction information corresponds to a selection type in the target selection condition.

In the present embodiment, the display mode corresponding to the selection type of the target selection condition is optionally adopted for displaying the target interaction information. Therefore, the selection type to which the target interaction information belongs can be further highlighted by the display mode, so as to enhance the intuitiveness of the information display. Examples of several display modes corresponding to different selections are as follows.

For example, the selection type in the target selection condition includes the selection condition input in the search control, then displaying, with a corresponding display mode, the target interaction information in the target area of the real-time interactive interface distinctively from other interaction information elements in the interaction information record, includes:

displaying the target interaction information together with other content of the interaction information record in the target area of the real-time interactive interface, with the display mode of the target interaction information being different from that of other content of the interaction information record.

In the method, the target interaction information is selected by means of search, and the user may pay attention to the content of the information itself, or may pay attention to a position and context of the interaction information in all the information. In this way, the target interaction information may be displayed together with other information, and the target interaction information may be displayed distinctively in a special display mode.

The display mode may include at least one of the following:
highlighting the target interaction information in the interaction information record;
covering all or part of other content of the interaction information record with a cover, wherein the cover is translucent; or
displaying the target interaction information in a preset font.

Of course, any other display modes capable of distinctively displaying the target interaction information are applicable.

For another example, the selection type in the target selection condition includes the selection condition inputted in a selection control, then displaying, with a corresponding display mode, the target interaction information in the target area of the real-time interactive interface distinctively from other interaction information elements in the interaction information record, may specifically include:
displaying the target interaction information and other content of the interaction information record in different target areas of the real-time interactive interface.

In the above manner, the target interaction information and other interaction information elements are placed in different areas for display. For example, the overall interaction information record display area can be divided into two or more sub-areas, where one sub-area may display the selected shared content, and the other sub-area may display the text of the voice data. Alternatively, after the selection, only the target interaction information may be displayed, and the display of other interaction information elements may be prevented, so that the target interaction information can be displayed distinctively from other interaction information elements.

Embodiment 5

Figure 5:
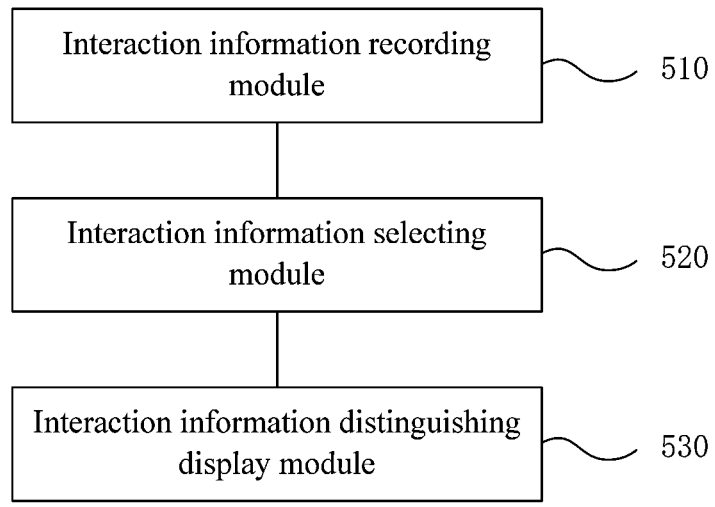
FIG. 5 is a schematic diagram illustrating the structure of an apparatus for processing interaction information according to embodiment 5 of the present disclosure.

FIG. 5 is a schematic diagram illustrating the structure of an apparatus for processing interaction information according to embodiment 5 of the present disclosure. The apparatus for processing interaction information according to the present embodiment may be implemented in hardware and/or software, and is used to filter and display the interaction information in an application scenario where users perform real-time interaction with application software. The apparatus for processing interaction information may be integrated in a client, or may be integrated in a server to provide services for clients.

As shown in FIG. 5, the apparatus for processing interaction information includes: an interaction information recording module 510, an interaction information selecting module 520 and an interaction information distinguishing display module 530. The interaction information recording module 510 is configured to generate an interaction information record based on interaction behavior data of users in an interaction process conducted by the users on a real-time interactive interface. The interaction information selecting module 520 is configured to select, from the interaction information record, target interaction information that satisfies a target selection condition. The interaction information distinguishing display module 530 is configured to display the target interaction information in a target area of the real-time interactive interface distinctively from other interaction information elements in the interaction information record, where the target interaction information is one or more interaction information elements in the interaction information record.

With the technical solutions of the embodiments of the present disclosure, the interaction information record during a real-time interaction process of the users can be effectively filtered and displayed in different manners by setting a selection condition, so that the interacting user can selectively acquire the interaction information, thereby improving the efficiency of interaction.

In the embodiment of the present disclosure, the method is applicable in a real-time interaction application scenario, especially applicable in a real-time multimedia interactive application scenario in which the users interact with various multimedia. The application scenario is implemented by Internet-based application software. The real-time interactive interface is any interactive interface in the multimedia real-time interactive application scenario, for example, it may be a video conference interactive interface, a live video interactive interface, or a group chat interactive interface.

The interaction behavior data may include user voice data and/or user operational behavior data; and content of the interaction information record may include text data obtained by recognizing the user voice data and/or the type and content of the user operational behavior.

The user operational behavior data may include a sharing behavior and shared content. The sharing behavior is an operational behavior type of presenting the shared content to each user. The shared content may include a shared document, a shared screen and/or a web link.

The target selection condition is a condition in any point of view for making selection from the interaction information record. For example, the target selection condition may include at least one of the following conditions: a content keyword, a speaking user of voice data, an activity level of the speaking user, an operational behavior types, or an operational behavior content object.

There are many ways to determine the target selection condition. The apparatus may further include:
a control acquiring module, configured to acquire the target selection condition inputted by the user through a selection control or a search control on the real-time interactive interface; where the selection control includes at least one of a selection list, a condition input box and an option label.

The user can independently input the target selection condition through the control, which directly reflects selection intention of the user.

Embodiment 6

Figure 6:
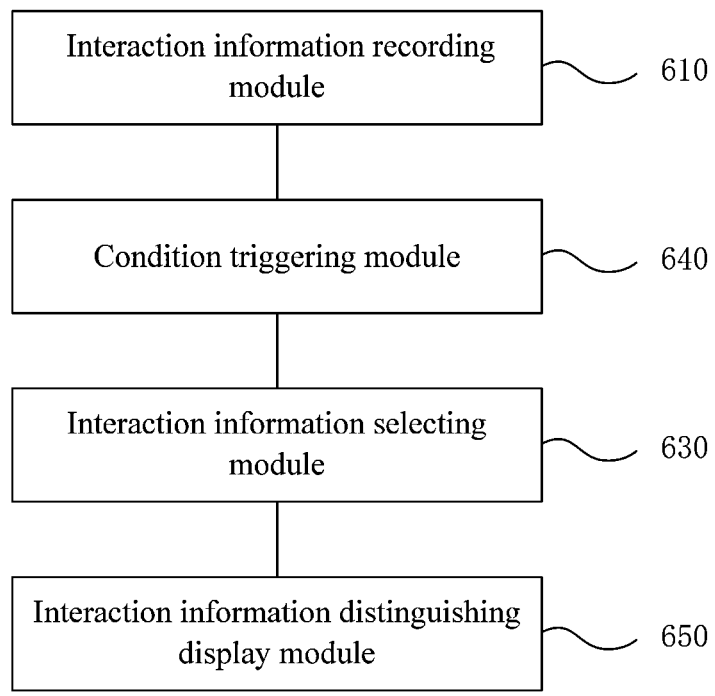
FIG. 6 is a schematic diagram illustrating the structure of an apparatus for processing interaction information according to embodiment 6 of the present disclosure.

FIG. 6 is a schematic diagram illustrating the structure of an apparatus for processing interaction information according to embodiment 6 of the present disclosure. On the basis of the foregoing embodiments, the present embodiment further provides an implementation of determining the selection condition.

The apparatus includes: an interaction information recording module 610, an interaction information selecting module 620, and an interaction information distinguishing display module 630, and further includes a condition triggering module 640, which is configured to determine the target selection condition in response to detecting a preset triggering condition, before selecting, from the interaction information record, the target interaction information that satisfies the target selection condition.

According to the present embodiment, the acquisition of the target selection condition can be automatically triggered based on the preset triggering condition, or content of the target selection condition can be further automatically determined.

Optionally, the triggering condition includes at least one of the following: reaching a preset time point in the interaction, the user voice data including indicative voice data, or language types used by speaking users being different.

On the basis of the above description, the condition triggering module may be specifically configured to determine the target selection condition in response to detecting the preset triggering condition based on collected interaction behavior data, during a real-time interaction process of the users.

Optionally, the condition triggering module specifically may include at least one of the following functional units:
an activity determining unit, configured to determine a current activity value of each user based on the collected interaction behavior data, and determine the target selection condition based on the current activity value;
a language determining unit, configured to determine a language type used by each user based on the collected interaction behavior data, and determine the target selection condition based on the language type;
a semantics determining unit, configured to determine a substantive meaning of the interaction behavior data based on the collected interaction behavior data, and determine the target selection condition based on validity or invalidity of the substantive meaning of the interaction behavior data.

The activity determining unit may be specifically configured to determine a user whose current activity value is higher than a preset activity value as the target selection condition.

The language determining unit may be specifically configured to determine a current language type corresponding to each user based on voice data in the interaction behavior data, and determine other language types different from the current language type as the target selection condition; or, determine a preset target language type of each client, and determine other language types different from the target language type as the target selection condition.

Further, the apparatus may further include a voiceprint recognizing module, configured to perform voiceprint recognition on voice data of each user, to determine a speaking user to which the voice data belongs, before determining a language type used by each user based on the collected interaction behavior data.

On the basis of the above technical solutions, the determined target interaction information may be displayed distinctively in a variety of different modes.

Optionally, the interaction information distinguishing display module may be specifically configured to display, with a corresponding display mode, the target interaction information in a target area of the real-time interactive interface distinctively from other interaction information elements in the interaction information record; where the display mode corresponds to a selection type in the target selection condition.

The interaction information distinguishing display module may be specifically further configured to display the target interaction information together with other content of the interaction information record in the target area of the real-time interactive interface, with the display mode of the target interaction information being different from that of other content of the interaction information record.

Alternatively, the interaction information distinguishing display module may be specifically configured to display the target interaction information and other content of the interaction information record in different target areas of the real-time interactive interface.

In the above technical solutions, the display mode includes at least one of the following:
highlighting the target interaction information in content of the interaction information record;
covering all or part of other content of the interaction information record with a cover, wherein the cover is translucent; or
displaying the target interaction information in a preset font.

The apparatus for processing interaction information according to the embodiment of the present disclosure can execute the method for processing interaction information according to any embodiment of the present disclosure, and has functional modules and advantageous effects corresponding to the method.

It should be noted that the division of the units and the modules in the above apparatus is merely based on logical functions, and is limited to the above description, as long as the corresponding functions can be realized. In addition, the terms used for identifying the functional units are only to distinguish among the different units, and are not intended to limit the scope of protection of the embodiments of the present disclosure.

Embodiment 7

Hereinafter reference is made to FIG. 7 which shows a schematic structural diagram of an electronic device (for example, the terminal device or server in FIG. 7) 700 suitable for implementing the embodiments of the present disclosure. The terminal device in the embodiments of the present disclosure may include, but not limited to, mobile terminals such as a mobile phone, a notebook computer, a digital broadcast receiver, a personal digital assistance (PDA), a portable android device (PAD), a portable media player (PMP) and a vehicle terminal (such as a vehicle navigation terminal); and fixed terminals such as digital television (TV) and a desktop computer. The electronic device shown in FIG. 7 is exemplary, and is not intended to limit the function and usage scope of the embodiments of the present disclosure.

Figure 7:
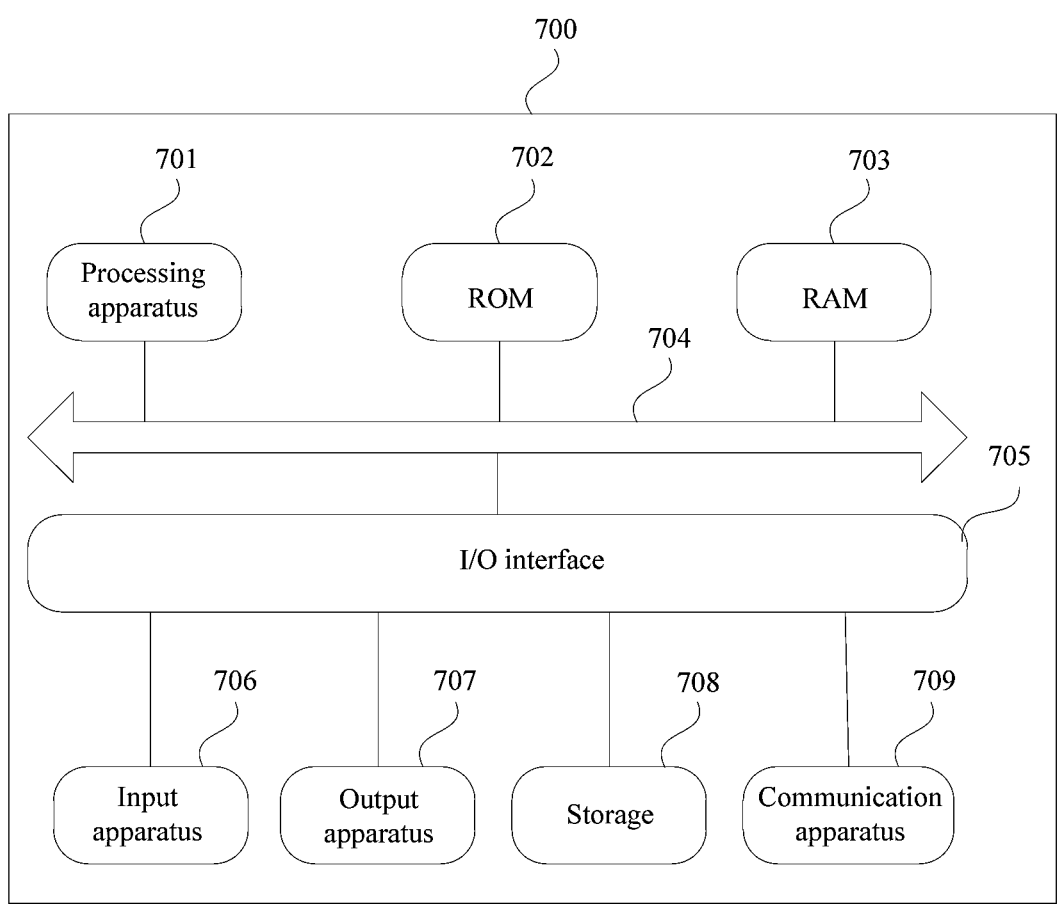
FIG. 7 is a schematic diagram illustrating the structure of an electronic device according to embodiment 7 of the present disclosure.

As shown in FIG. 7, the electronic device 700 may include a processing apparatus (such as a central processor and a graphic processor) 701. The processing apparatus may perform various appropriate actions and processing based on programs stored in a read-only memory (ROM) 702 or programs uploaded from a storage apparatus 708 to a random access memory (RAM) 703. Various programs and data required for operations of the electronic device 700 are also stored in the RAM 703. The processing apparatus 701, the ROM 702 and the RAM 703 are connected to each other through the bus 704. An input/output (I/O) interface 705 is also connected to the bus 704.

Generally, the following apparatuses may be connected to the I/O interface 705: an input apparatus 706 such as a touch screen, a touch panel, a keyboard, a mouse, a camera, a microphone, an accelerometer, and gyroscope; an output apparatus 707 such as a liquid crystal display (LCD), a loudspeaker and a vibrator; a storage apparatus 708 such as a magnetic tape and a hard disk; and a communication apparatus 709. The communication apparatus 709 may allow the electronic device 700 to communicate with other device in a wired or wireless manner to exchange data. Although FIG. 7 shows the electronic device 700 provided with various apparatuses, it should be understood that not all shown apparatuses are required to be implemented or included. Alternatively, more or less apparatuses may be implemented or included.

According to the embodiments of the present disclosure, a process described with reference to the flowchart above may particularly be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 709, installed from the storage apparatus 708 or installed from the ROM 702. The computer program is executed by the processing apparatus 701 to perform functions defined in the methods described in the embodiments of the present disclosure.

The electronic device according to the embodiment of the present disclosure has a same invention concept as the method for processing interaction information according to the above-mentioned embodiment. For the technical details not described in detail in this embodiment, reference may be made to the above-mentioned embodiment, and the present embodiment has the same advantageous effects as the above-mentioned embodiment.

Embodiment 8

A computer storage medium on which a computer program is stored is provided according to the embodiment 8 of the present disclosure. The program, when being executed by a processor, implements the method for processing interaction information according to the foregoing embodiments.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed in the further, and may connect with digital data communication in any form or carried in any medium (for example, a communication network). Examples of the communication network include a local area network (LAN), a wide area network (WAN), Internet, and an end-to-end network (such as, ad hoc end-to-end network), and any currently known or future developed network.

The computer readable storage medium may be included in the electronic device, or may stand alone without being assembled into the electronic device.

The computer readable medium carries one or more programs. The one or more programs, when executed by the electronic device, enable the electronic device to perform the following operations:

generating an interaction information record based on interaction behavior data of users in an interaction process conducted by the users on a real-time interactive interface;

selecting, from the interaction information record, target interaction information that satisfies a target selection condition; and displaying the target interaction information in a target area of the real-time interactive interface distinctively from other interaction information elements in the interaction information record, where the target interaction information is one or more interaction information elements in the interaction information record.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architecture, function and operation which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or actions, or may be realized by a combination of dedicated hardware and computer instructions.

The units mentioned in the description of the embodiments of the present disclosure may be implemented by means of software, or otherwise by means of hardware. A name of the unit/module does not constitute a limitation to the unit in some cases. For example, the to-be-shared user determining module may be described as "user determining module".

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

According to one or more embodiments of the present disclosure, a method for processing interaction information is provided according to Example 1. The method includes:
generating an interaction information record based on interaction behavior data of users in an interaction process conducted by the users on a real-time interactive interface;
selecting, from the interaction information record, target interaction information that satisfies a target selection condition; and
displaying the target interaction information in a target area of the real-time interactive interface distinctively from other interaction information elements in the interaction information record, where the target interaction information is one or more interaction information elements in the interaction information record.

According to one or more embodiments of the present disclosure, a method for processing interaction information is provided according to Example 2. The method further includes:
optionally, the user operational behavior data includes a sharing behavior and shared content, the sharing behavior is an operational behavior type of presenting the shared content to each user, and the shared content includes a shared document, a shared screen and/or web link.

According to one or more embodiments of the present disclosure, a method for processing interaction information is provided according to Example 3. The method further includes:
optionally, the interaction behavior data includes user voice data, and content of the interaction information record includes text data obtained by recognizing the user voice data;
or,
the interaction behavior data includes user operational behavior data, and content of the interaction information record includes text data obtained by recognizing the user operational behavior data;
or,
the interaction behavior data includes user voice data and user operational behavior data, and content of the interaction information record includes text data obtained by recognizing the user voice data and text data obtained by recognizing the user operational behavior data.

According to one or more embodiments of the present disclosure, a method for processing interaction information is provided according to Example 4. The method further includes:
optionally, the target selection condition includes at least one of the following conditions: a content keyword, a speaking user of voice data, an activity level of the speaking user, an operational behavior type, or an operational behavior content object.

According to one or more embodiments of the present disclosure, a method for processing interaction information is provided according to Example 5. The method further includes:
optionally, the target selection condition is determined in the following manner:
acquiring the target selection condition inputted by the user through a selection control or a search control on the real-time interactive interface;
where, the selection control includes at least one of a selection list, a condition input box or an option label.

According to one or more embodiments of the present disclosure, a method for processing interaction information is provided according to Example 6. The method further includes:
optionally, before the selecting, from the interaction information record, target interaction information that satisfies a target selection condition, the method further includes:
determining the target selection condition in response to detecting a preset triggering condition.

According to one or more embodiments of the present disclosure, a method for processing interaction information is provided according to Example 7. The method further includes:
- optionally, the triggering condition includes at least one of the following: reaching a preset time point in the interaction, user voice data comprising indicative voice data, or language types used by speaking users being different.

According to one or more embodiments of the present disclosure, a method for processing interaction information is provided according to Example 8. The method further includes:
- optionally, the determining the target selection condition in response to detecting a preset triggering condition, includes:
- determining the target selection condition in response to detecting the preset triggering condition based on collected interaction behavior data, during a real-time interaction process of the users.

According to one or more embodiments of the present disclosure, a method for processing interaction information is provided according to Example 9. The method further includes:
- optionally, the determining the target selection condition in response to detecting the preset triggering condition based on collected interaction behavior data, during a real-time interaction process of the users, includes at least one of the following:
- determining a current activity value of each user based on the collected interaction behavior data, and determining the target selection condition based on the current activity value;
- determining a language type used by each user based on the collected interaction behavior data, and determining the target selection condition based on the language type; or
- determining a substantive meaning of the interaction behavior data based on the collected interaction behavior data, and determining the target selection condition based on validity or invalidity of the substantive meaning of the interaction behavior data.

According to one or more embodiments of the present disclosure, a method for processing interaction information is provided according to Example 10. The method further includes:
- optionally, the determining the target selection condition based on the current activity value includes:
- determining a user whose current activity value is higher than a preset activity value as the target selection condition.

According to one or more embodiments of the present disclosure, a method for processing interaction information is provided according to Example 11. The method further includes:
- optionally, the determining a language type used by each user based on the collected interaction behavior data, and determining the target selection condition based on the language type, includes:
- determining a current language type corresponding to each user based on voice data in the interaction behavior data, and determining other language types different from the current language type as the target selection condition; or,
- determining a preset target language type of each client, and determining other language types different from the target language type as the target selection condition.

According to one or more embodiments of the present disclosure, a method for processing interaction information is provided according to Example 12. The method further includes:
- optionally, before determining a language type used by each user based on the collected interaction behavior data, the method further includes:
- performing voiceprint recognition on voice data of each user, to determine a speaking user to which the voice data belongs.

According to one or more embodiments of the present disclosure, a method for processing interaction information is provided according to Example 13. The method further includes:
- optionally, the displaying the target interaction information in a target area of the real-time interactive interface distinctively from other interaction information elements in the interaction information record, includes:
- displaying, with a corresponding display mode, the target interaction information in the target area of the real-time interactive interface distinctively from other interaction information elements in the interaction information record; where the display mode corresponds to a selection type in the target selection condition.

According to one or more embodiments of the present disclosure, a method for processing interaction information is provided according to Example 14. The method further includes:
- optionally, the selection type in the target selection condition includes a selection condition inputted in a search control, and the displaying, with a corresponding display mode, the target interaction information in the target area of the real-time interactive interface distinctively from other interaction information elements in the interaction information record, includes:
- displaying the target interaction information together with other content of the interaction information record in the target area of the real-time interactive interface, with a display mode of the target interaction information being different from that of other content of the interaction information record.

According to one or more embodiments of the present disclosure, a method for processing interaction information is provided according to Example 15. The method further includes:
- optionally, the selection type in the target selection condition includes a selection condition inputted in a selection control, and the displaying, with a corresponding display mode, the target interaction information in the target area of the real-time interactive interface distinctively from other interaction information elements in the interaction information record, includes:
- displaying the target interaction information and other content of the interaction information record in different target areas of the real-time interactive interface.

According to one or more embodiments of the present disclosure, a method for processing interaction information is provided according to Example 16. The method further includes:
- optionally, the display mode of the target interaction information includes at least one of the following:
- highlighting the target interaction information in content of the interaction information record;

covering all or part of other content of the interaction information record with a cover, wherein the cover is translucent; or displaying the target interaction information in a preset font.

According to one or more embodiments of the present disclosure, a method for processing interaction information is provided according to Example 17. The method further includes:

optionally, the real-time interactive interface includes a video conference interactive interface, a live video interactive interface or a group chat interactive interface.

According to one or more embodiments of the present disclosure, an apparatus for processing interaction information is provided according to Example 18. The apparatus includes:

an interaction information recording module, configured to generate an interaction information record based on interaction behavior data of users in an interaction process conducted by the users on a real-time interactive interface;

an interaction information selecting module, configured to select, from the interaction information record, target interaction information that satisfies a target selection condition; and an interaction information distinguishing display module, configured to display the target interaction information in a target area of the real-time interactive interface distinctively from other interaction information elements in the interaction information record, where the target interaction information is one or more interaction information elements in the interaction information record.

According to one or more embodiments of the present disclosure, a storage medium comprising computer-executable instructions is provided. The computer-executable instructions, when being executed by a computer processor, implement the method for processing interaction information according to any of embodiments of the present disclosure.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. Conversely, the specific features and acts described above are merely example forms of implementing the claims.

The invention claimed is:

1. A method for processing interaction information, comprising:

generating an interaction information record based on interaction behavior data of users in an interaction process conducted by the users on a real-time interactive interface, wherein the interaction process comprises a multimedia conference interaction or a live multimedia interaction;

dynamically generating, based on contents of the interaction information record, a content of a selection control on the real-time interactive interface, wherein contents of the interaction information record comprise at least one of users participating in the interaction process and the interaction behavior data of the users;

in response to detecting a preset triggering condition, acquiring a target selection condition for selecting interaction information in connection with a target user of the users participating in the interaction process through the selection control, wherein the preset triggering condition comprises at least one of the following: reaching a preset time point in the interaction process, user voice data comprising indicative voice data, or language type used by a speaking user being different from that of a current client;

selecting, from the interaction information record, target interaction information that satisfies the target selection condition, wherein the target interaction information comprises speech text of the target user or text corresponding to operations of the target user; and displaying the target interaction information in a target area of the real-time interactive interface distinctively from other interaction information elements in the interaction information record, wherein the target interaction information is one or more interaction information elements in the interaction information record.

2. The method according to claim 1, wherein,
the interaction behavior data comprises user voice data, and content of the interaction information record comprises text data obtained by recognizing the user voice data;
or,
the interaction behavior data comprises user operational behavior data, and content of the interaction information record comprises text data obtained by recognizing the user operational behavior data;
or,
the interaction behavior data comprises user voice data and user operational behavior data, and content of the interaction information record comprises text data obtained by recognizing the user voice data and text data obtained by recognizing the user operational behavior data.

3. The method according to claim 2, wherein the user operational behavior data comprises a sharing behavior and shared content, the sharing behavior is an operational behavior type of presenting the shared content to each user, and the shared content comprises at least one of a shared document, a shared screen and web link.

4. The method according to claim 2, wherein the target selection condition comprises at least one of the following conditions: a content keyword, a speaking user of voice data, an activity level of the speaking user, an operational behavior type, or an operational behavior content object.

5. The method according to claim 1, wherein the target selection condition is further determined in the following manner:
a search control on the real-time interactive interface;
wherein the selection control comprises at least one of a selection list, a condition input box or an option label.

6. The method according to claim 1, wherein the determining the target selection condition in response to detecting a preset triggering condition, comprises:
determining the target selection condition in response to detecting the preset triggering condition based on collected interaction behavior data, during a real-time interaction process of the users.

7. The method according to claim 6, wherein the determining the target selection condition in response to detecting the preset triggering condition based on collected interaction behavior data, during a real-time interaction process of the users, comprises at least one of the following:
determining a current activity value of each user based on the collected interaction behavior data, and determining the target selection condition based on the current activity value;
determining a language type used by each user based on the collected interaction behavior data, and determining the target selection condition based on the language type; or
determining a substantive meaning of the interaction behavior data based on the collected interaction behavior data, and determining the target selection condition based on validity of the substantive meaning of the interaction behavior data.

8. The method according to claim 7, wherein the determining the target selection condition based on the current activity value comprises:
determining a user, whose current activity value is higher than a preset activity value, as the target selection condition.

9. The method according to claim 7, wherein the determining a language type used by each user based on the collected interaction behavior data, and determining the target selection condition based on the language type, comprises:
determining a current language type corresponding to each user based on voice data in the interaction behavior data, and determining other language types different from a current language type of a local client as the target selection condition; or
determining a preset target language type of each client, and determining other language types different from the preset target language type as the target selection condition.

10. The method according to claim 7, wherein, before determining a language type used by each user based on the collected interaction behavior data, the method further comprises:
performing voiceprint recognition on voice data of each user, to determine a speaking user to whom the voice data belongs.

11. The method according to claim 1, wherein the displaying the target interaction information in a target area of the real-time interactive interface distinctively from other interaction information elements in the interaction information record, comprises:
displaying, with a corresponding display mode, the target interaction information in the target area of the real-time interactive interface distinctively from other interaction information elements in the interaction information record; wherein the display mode corresponds to a selection type in the target selection condition.

12. The method according to claim 11, wherein the selection type in the target selection condition comprises a selection condition inputted in a search control, and the displaying, with a corresponding display mode, the target interaction information in the target area of the real-time interactive interface distinctively from other interaction information elements in the interaction information record, comprises:
displaying the target interaction information together with other content of the interaction information record in the target area of the real-time interactive interface, with the display mode of the target interaction information being different from that of other content of the interaction information record.

13. The method according to claim 11, wherein the selection type in the target selection condition is acquired through the selection control, and the displaying, with a corresponding display mode, the target interaction information in the target area of the real-time interactive interface distinctively from other interaction information elements in the interaction information record, comprises:
displaying the target interaction information and other content of the interaction information record in different target areas of the real-time interactive interface.

14. The method according to claim 11, wherein the display mode comprises at least one of the following:
highlighting the target interaction information in content of the interaction information record;
covering all or part of other content of the interaction information record with a cover, wherein the cover is translucent; or
displaying the target interaction information in a preset font.

15. The method according to claim 1, wherein the real-time interactive interface comprises a video conference interactive interface, a live video interactive interface or a group chat interactive interface.

16. An electronic device, comprising:
one or more processors;
a storage device configured to store one or more programs, wherein
generating an interaction information record based on interaction behavior data of users in an interaction process conducted by the users on a real-time interactive interface, wherein the interaction process comprises a multimedia conference interaction or a live multimedia interaction;
dynamically generating, based on contents of the interaction information record, a content of a selection control on the real-time interactive interface, wherein contents of the interaction information record comprise at least one of users participating in the interaction process and the interaction behavior data of the users;
in response to detecting a preset triggering condition, acquiring a target selection condition for selecting interaction information in connection with a target user of the users participating in the interaction process through the selection control, wherein the preset triggering condition comprises at least one of the following: reaching a preset time point in the interaction process, user voice data comprising indicative voice data, or language type used by a speaking user being different from that of a current client;

selecting, from the interaction information record, target interaction information that satisfies the target selection condition, wherein the target interaction information comprises speech text of the target user or text corresponding to operations of the target user; and displaying the target interaction information in a target area of the real-time interactive interface distinctively from other interaction information elements in the interaction information record, wherein the target interaction information is one or more interaction information elements in the interaction information record.

17. A non-transitory storage medium having computer-executable instructions stored thereon, wherein the computer-executable instructions, when being executed by a computer processor, implement:

generating an interaction information record based on interaction behavior data of users in an interaction process conducted by the users on a real-time interactive interface, wherein the interaction process comprises a multimedia conference interaction or a live multimedia interaction;

dynamically generating, based on contents of the interaction information record, a content of a selection control on the real-time interactive interface, wherein contents of the interaction information record comprise at least one of users participating in the interaction process and the interaction behavior data of the users;

in response to detecting a preset triggering condition, acquiring a target selection condition for selecting interaction information in connection with a target user of the users participating in the interaction process through the selection control, wherein the preset triggering condition comprises at least one of the following: reaching a preset time point in the interaction process, user voice data comprising indicative voice data, or language type used by a speaking user being different from that of a current client;

selecting, from the interaction information record, target interaction information that satisfies the target selection condition, wherein the target interaction information comprises speech text of the target user or text corresponding to operations of the target user; and displaying the target interaction information in a target area of the real-time interactive interface distinctively from other interaction information elements in the interaction information record, wherein the target interaction information is one or more interaction information elements in the interaction information record.

* * * * *